Aug. 8, 1950 W. F. SANDS 2,517,719

FREQUENCY CONVERTER SYSTEM

Filed March 30, 1945 2 Sheets-Sheet 1

INVENTOR.
WILLIAM F. SANDS

BY H. G. Grover

ATTORNEY

INVENTOR.
WILLIAM F. SANDS
BY H. G. Grover
ATTORNEY

Patented Aug. 8, 1950 2,517,719

UNITED STATES PATENT OFFICE 2,517,719

FREQUENCY CONVERTER SYSTEM

William F. Sands, Haddonfield, N. J., assignor to Radio Corporation of America, a corporation of Delaware Application March 30, 1945, Serial No. 585,747

15 Claims. (Cl. 250—20)

The present invention relates to frequency converter circuits for superheterodyne receivers, and more particularly to that type of converter circuit which utilizes a single tube for performing the dual functions of the local oscillator and first detector.

One of the objects of the invention is to provide a simple converter circuit utilizing a triode or a multi-grid tube (such as a tetrode, pentode, or hexode) having a minimum number of component parts, and one which offers improved performance over known converter circuits utilizing triodes or multi-grid tubes.

Another object of the invention is the utilization of circuit constants for the converter network of such values that the conversion gain of the circuit at the low end of the frequency band is improved.

A further object of the invention is to minimize the loading effect of the converter grid circuit on the resonant, tunable signal input circuit by increasing the grid resistor to a value heretofore considered unusable while preventing the establishment of blocking oscillations which would normally occur by a degenerative feedback effective only at frequencies comparable to the frequency at which the tube tends to oscillate due to the unusually high grid resistance employed.

A still further object of the invention is to provide maximum conversion gain in a combined detector-oscillator system by preventing the establishment of two out-of-phase intermediate frequency currents which would result from simultaneous grid and plate circuit rectification.

The novel features characteristic of my invention both as to its organization and mode of operation together with further objects and advantages thereof, will best be understood by reference to the following description taken in connection with the accompanying drawings, in which.

Figures 1, 3, 4:
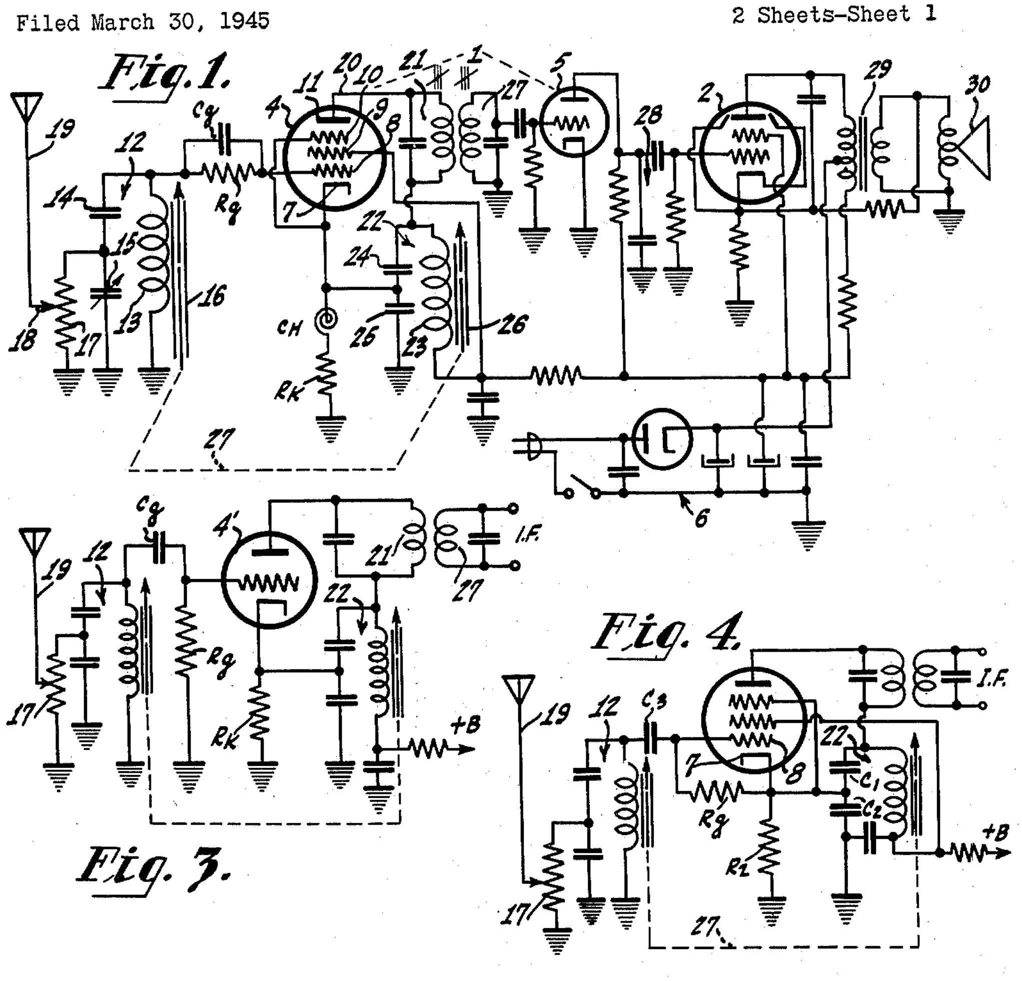
Fig. 1 is a circuit diagram of a complete receiver utilizing one embodiment of a novel converter circuit according to the invention.
Figs. 3, 4 and 5 illustrate other embodiments of converter circuits according to the invention.

For illustrative purposes only and not in any limiting sense, one form of converter circuit according to the invention is shown in Fig. 1 as embodied in a low cost, portable or small table model receiver which utilizes a minimum number of tubes and which is designed to have good selectivity and sensitivity and ample sound power output. While the converter circuits herein disclosed are particularly advantageous in receivers of the type mentioned, they are capable of use in other receiver circuits wherein it is desired to utilize a simple triode or multi-grid tube as the converter.

As shown in Fig. 1, the receiver includes three tubes designated 1, 2 and 3. Tube 1 is a dual purpose tube of known type which may be the "25B8–GT," and is provided with independent electrode sections 4 and 5. Section 4 is a pentode serving as the frequency converter stage and section 5 is a triode serving as the second detector. Tube 2 is a power amplifier of the beam type which may be the "50L6–GT," and tube 3 which may be of the type known as "4525–GT" is a rectifier in the power supply circuit, indicated generally at 6, which supplies the necessary D. C. operating potentials for the various tubes mentioned above.

The pentode section 4 constituting the converter stage comprises a cathode 7, a signal control grid 8, a screen grid 9, a suppressor grid 10 and an anode 11. Coupled to the control grid 8 through a condenser $C_g$ shunted by a resistance $R_g$, both of suitable values to be described hereinafter, is a signal frequency circuit 12. The latter circuit comprises a permeability tuned inductance 13 shunted by a pair of series-connected condensers 14 and 15, tuning of said circuit being accomplished by means of a magnetic core 16 axially adjustable within inductance coil 13 in a manner well-known in the art. A volume control resistance 17 is connected between the common terminal of the series condensers 14, 15 and ground, and an adjustable connection 18 on this resistance leads to a source of signal energy such as a capacity type antenna 19.

The cathode 7 of section 4 is connected to ground through a radio frequency choke CH in series with a biasing resistance $R_k$. Included in the external circuit 20 connected to the plate 11 are the series connected circuits 21 and 22 which are, respectively, the fixed-tuned intermediate frequency and the tunable local oscillator circuits of the receiver. Oscillator circuit 22 which is of the Colpitts type comprises a permeability tuned inductance 23 shunted effectively by a pair of series-connected condensers 24 and 25, the common terminal of which is connected to cathode 7. Tuning of oscillator circuit 22 is accomplished by means of a magnetic core 26 which is axially adjustable within coil 23, and the two cores 16 and 26 are controlled in unison by suitable means represented by the dash line 27. While iron-core or permeability tuned circuits are shown for circuits 12 and 22, it will of course be understood by those skilled in the art that these circuits may otherwise be tuned, as by means of a pair of uni-controlled variable condensers.

The oscillations of the two uni-controlled circuits 12 and 22 are combined or mixed in the cathode-anode circuit of the converter or pentode section 4 of tube 1 in a known manner to provide in output circuit 21 a resultant frequency, commonly referred to as the intermediate frequency (IF), and the tunable circuits and their respective cores are so designed that the intermediate frequency remains substantially constant as the receiver is tuned over the operating frequency range, as for example the broadcast band, from 550 to 1600 kc.

Since the remaining portions of the receiver circuit form no part of the present invention, only a brief description thereof will suffice. Circuit 21 is coupled to a second, similarly tuned IF circuit 27 which constitutes the input to triode section 5 of tube 1 acting as the second detector. The output of detector 5 is coupled by means of a resistance-capacity network 28 to power amplifier tube 2, the output of which in turn is coupled through an output transformer 29 to a loudspeaker 30, which in the receiver herein described was of the permanent magnet, electrodynamic type.

It is found that the full advantages of the circuit illustrated may be realized by a careful selection of the values of $C_g$, $R_g$, $R_k$ and radio frequency choke CH so as to provide for maximum conversion gain, stable operation of the oscillator across the band, and freedom from "motor-boating." Thus, for small values of $R_g$ the sensitivity decreases rapidly at the low end of the band while for large values of the order of 10 to 20 megohms, the sensitivity is quite flat across the band. In the above described receiver of Fig. 1 a suitable value for condenser $C_g$ was found to be 82 $\mu\mu$f. although values as large as 1000 $\mu\mu$f. are preferred because of the resulting increase in sensitivity, as will be shown later in the specification. In using the circuit of Fig. 1, if the resistor $R_k$ is either omitted or bypassed by a large condenser, then a small value for $C_g$ is required since large values of $C_g$ would cause the receiver to "motor-boat." The value of $R_k$ must be large enough to provide the operating grid bias but not so large that the oscillator stops operating at the high end of the band. For values of $R_k$ from 1000 to 1200 ohms (unbypassed) the performance was quite satisfactory and values of $C_g$ from 82 $\mu\mu$f. to 1000 $\mu\mu$f. (or larger) could be used. The RF choke CH should not have large and sharp changes in impedance over the operating frequency range.

Figure 5:
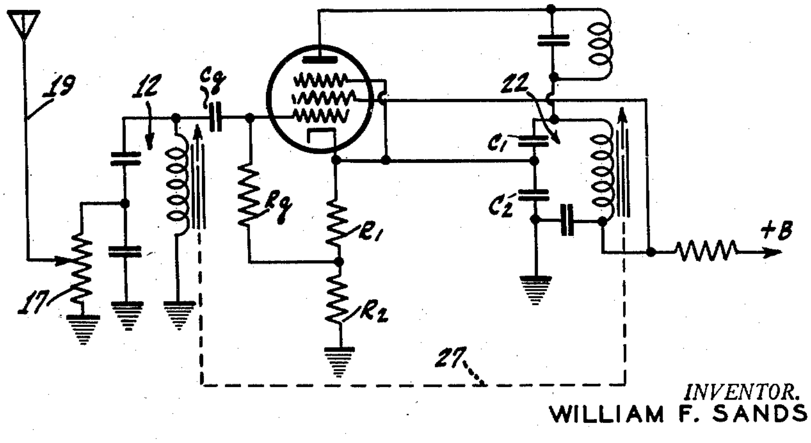

Although the RF choke was used in the circuit of Fig. 1 for particular values of the component parts and also for certain types of tubes, it may be omitted as shown in the modified form of converter circuit in Fig. 3. Instead of being connected directly in shunt across condenser $C_g$, the resistance $R_g$ may be connected between the signal grid and ground or to a point in the anode-cathode circuit as shown in Figs. 3, 4 and 5. The circuit of Fig. 3 also shows the use of a triode 4′ as the converter tube.

It has been found that, by using the circuit of Fig. 3, it is possible to effect a substantially uniform gain in the frequency conversion over the entire band of received signal frequencies.

Figure 2:
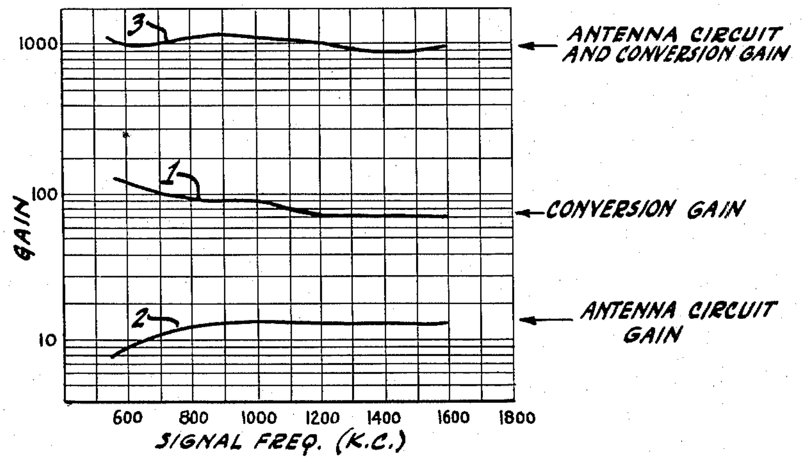
Fig. 2 shows gain curves of the receiver disclosed in Fig. 1.

Now, in general the gain of an antenna coupling network decreases toward the low end of the band. In Fig. 2, curve 1 shows the measured conversion gain of the three-tube superheterodyne receiver of Fig. 1 and curve 2 shows the measured antenna circuit gain, the former varying from 142.4 at 550 kc. to 70 at 1600 kc., and the latter varying from 7.63 at 550 kc. to 15.1 at 1600 kc. The product of the conversion gain and antenna circuit gain is shown in curve 3 and is seen to result in a substantially flat curve.

In Fig. 4 there is illustrated a further modified form of converter circuit which may be used satisfactorily at a slightly lower component parts cost. The self, or automatic, bias for control grid 8 is secured by means of a high resistance grid leak $R_g$ and a grid capacitor $C_g$, the former being connected directly to cathode 7 which in turn is connected to ground through a resistance $R_2$. It has been found that greatly improved performance is secured by the use of values of $R_g$ of from 10 megohms up to infinite resistance. The reasons for the use of the extremely large values of $R_g$ are twofold:

(1) Conduction in the diode formed by cathode 7 and grid 8 reduces the effective impedance of $R_{g_1}$ and increases the loading effect of the grid circuit. However this also produces a negative bias across the resistor $R_g$. Because of the large value of resistance employed, the negative grid bias will approach the peak amplitude of applied A. C. voltage so that conduction is prevented and the diode loading on signal frequency tuned circuit 12 is very slight.

Because of the high negative bias practically no rectification will take place at the signal grid. Since conversion at the signal grid opposes that at the plate of the converter tube (i. e., the conversion in the signal grid is degenerative with respect to the plate conversion, which is of practical interest in the receiver), an optimum conversion gain will be obtained for the particular circuit arrangement. For conventional values of $R_g$, rectification will take place at the signal grid (the amount being inversely proportional to the value of $R_g$) and the conversion gain will therefore not be optimum.

Figures 6, 7:
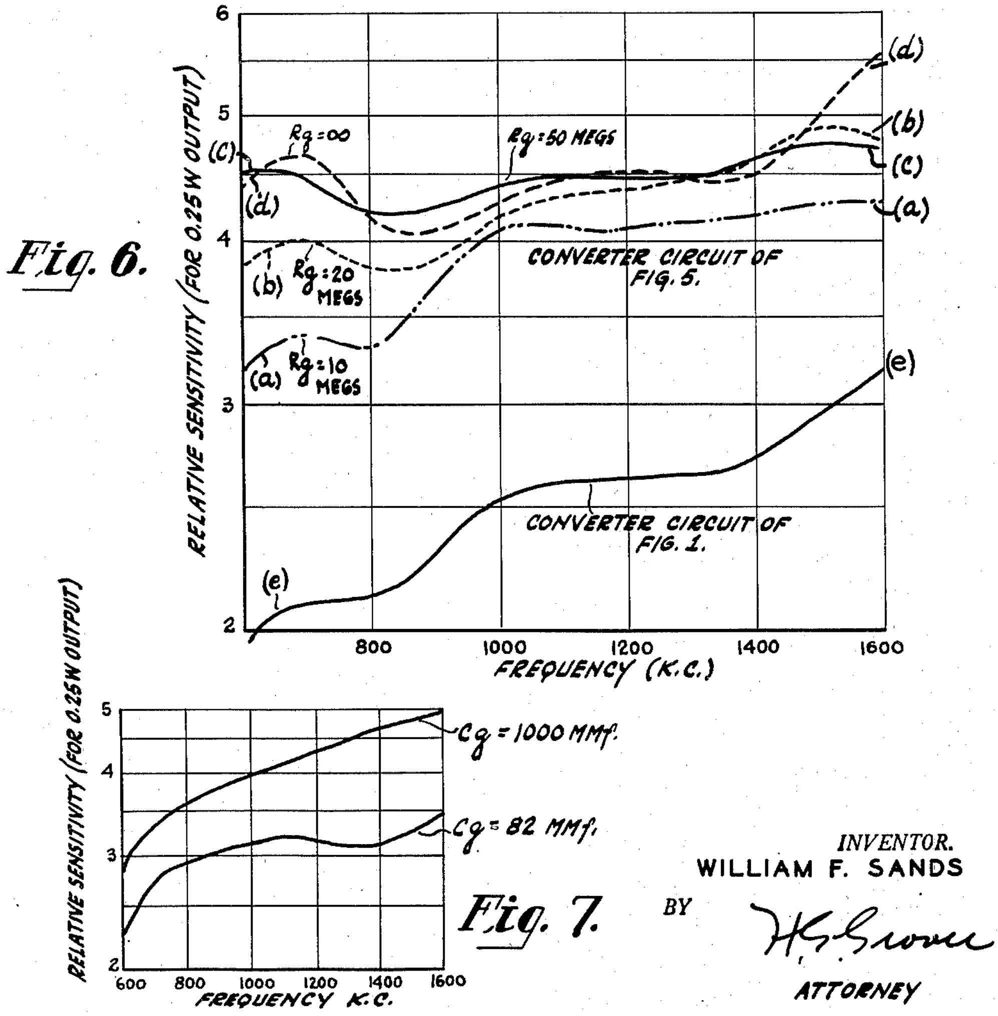
Fig. 6 shows relative sensitivity curves for various values of the grid resistor $R_g$.
Fig. 7 shows relative sensitivity curves for different values of the grid coupling capacitor $C_g$.

In Fig. 5, which is the preferred converter circuit arrangement, an additional bias is obtained by use of a cathode resistor $R_1$, and for a given value of $R_g$ the rectification at the signal grid will be decreased with respect to that obtained without $R_1$, resulting in improved conversion gain. Under this condition (using $R_1$=1,000 ohms and $R_2$=2,200 ohms) it has been found in practice that values of $R_g$ equal to 50 megohms yield results which are substantially equivalent to those for $R_g$ equal to infinity. Also, a value of $R_g$ as low as 10 megohms results in only a moderate decrease in sensitivity. These results are shown in Fig. 6 by the curves *a*, *b*, *c*, and *d* for values of resistance $R_g$ of 10, 20, 50 megohms, and infinite resistance, respectively. Curve *e* is the relative sensitivity of the converter circuit of Fig. 1 and is shown to make apparent the improvement in performance of the converter circuit of Fig. 5 over that of Fig. 1. For coupling condenser $C_g$ various values of from 22 $\mu\mu$f. to 5000 $\mu\mu$f. were tried. In Fig. 7 are shown curves which illustrate the considerable increase in sensitivity, particularly at the upper portion of the band, secured by use of $C_g$=1000 $\mu\mu$f. over that for $C_g$=82 μμf. Values of $C_g$ less than 82 μμf. resulted in further decrease in sensitivity whereas values greater than 1000 μμf. (such as 5000 μμf.) produced no further improvement in performance. Now, it may be seen that the increased sensitivity (for $C_g$=1000 μμf.) is much greater than that which could be anticipated merely on the basis of the decreased reactance of the larger value of $C_g$ at the signal frequency.

The explanation for this is as follows: The overall effect of rectification at the signal grid on the conversion gain depends upon two factors: (1) the amount of rectification which is permitted to take place, and (2) the impedance at the intermediate frequency presented to the rectified current. It was shown above that rectification may be reduced considerably by the use of a very large value for resistance $R_g$. As for factor (2) it will be apparent that the lower this impedance, the smaller will be the voltage at the intermediate frequency on the signal grid of the converter tube. It is well known that conversion at the signal grid effectively opposes that which takes place in the plate circuit. It is desirable therefore that there be practically no component of the intermediate frequency on the signal grid. The load impedance at the intermediate frequency from grid to ground is composed of the capacitor $C_g$ and the antenna network which is constituted by the tuned circuit 12, volume control 17 and antenna 19. The tuned circuit will, of course, have an inductive reactance at frequencies below resonance, and will therefore be inductive at the intermediate frequency.

By way of example, let the antenna network be replaced by a capacitor C of 90 μμf. and an adjustable coil L of 111 μh. (at 1600 kc.) to 980 μh. (at 540 kc.). In the discussion which follows, only the reactance of the load circuit from signal grid to ground, will be considered—as the equivalent series resistance will be quite low compared to the reactance. In the table below, the reactance (at an arbitrarily selected intermediate frequency of 455 kc.) of both 82 μμf. and 1000 μμf. grid capacitors ($C_g$) are compared with that of the LC circuit tuned to 540 kc. and to 1600 kc.

| $f_{LC}$ (kc.) | L (μh.) | C (μμf.) | $C_g$ (μμf.) | $X_{LC}$ (ohms) | $X_{C_g}$ (ohms) |
|---|---|---|---|---|---|
| 540 | 980 | 90 | 82 | 10,170 | −4,265 |
| 1,600 | 111 | 90 | 82 | 345 | −4,265 |
| 540 | 980 | 90 | 1,000 | 10,170 | −350 |
| 1,600 | 111 | 90 | 1,000 | 345 | −350 |

It is seen that the reactance of $C_g$=82 μμf. is quite large compared with that of the antenna network (tuned to the upper end of the band). Therefore by making $C_g$ at least 1000 μμf. (the capacitive reactance at 455 kc. is 350 ohms) the effective reactance of the grid condenser is made approximately equal to the reactance of signal input circuit 12, and is of opposite sign. Thus an effective series wave trap at the intermediate frequency is formed and the impedance at the IF from grid to ground is reduced to a very low value and the conversion gain is considerably improved, as evidenced by the greater sensitivity of the receiver. When the receiver is tuned to the low end of the band, the impedance of the antenna network (at the IF) is considerably larger, and therefore the effect of increasing $C_g$ to 1000 μμf. does not show up to as great an extent as it does at the higher end of the band.

It is obvious that normally the time-constant of the grid capicitor $C_g$ (1,000 μμfds.) and the large grid resistor $R_g$ will be such as to result in the production of relaxation or "blocking" oscillations at a low frequency which may be at a sub-audio or audio rate depending on the constants employed. For example, it has been found that $C_g$=82 μμf. and $R_g$=10 megohms (which combination has a time constant of 820 microseconds) will operate satisfactorily. When the grid resistor $R_g$ is entirely omitted from the circuit, the leakage resistance of the tube, tube socket, and the grid capacitor is possibly of the order of 1000 megohms. The time constant of the 1000 megohm leakage resistance and a 1000 μμf. grid capacitor $C_g$ is 1 second. That blocking does not take place, even where a grid resistor $R_g$ of infinite value (i. e. the grid resistor actually omitted from the circuit) is used, may be explained as follows: The cathode resistor $R_2$ is shunted by the capacitor $C_2$ of oscillator circuit 22 through the resistor $R_1$. At the very low audio frequencies, such as represented by the time-constants of combinations of such grid resistors and capacitors that may be used in the circuits under consideration, the capacitor $C_2$ has a capacitive reactance of the order of megohms and cannot be considered to offer any by-passing for the resistor $R_2$. Thus $R_2$, which may be, for example, of the order of 2200–3300 ohms, effects a high order of degeneration at the blocking frequency, and as a result the tube does not block. However, at the signal frequency, the reactance of $C_2$ is very low and forms an effective by-pass for the resistor $R_2$. Thus, the signal frequency voltage is not degenerated and the conversion gain is not reduced thereby.

While I have shown and described a preferred embodiment of my invention, it will be understood that various modifications and changes will occur to those skilled in the art without departing from the spirit and scope of this invention.

What I claim is:

1. In a signal receiving system, a combined detector-oscillator circuit, comprising in combination, an electron discharge device having at least a cathode, a signal control grid and an anode, an oscillator circuit having a connection to the cathode, and including as an element thereof a condenser connected between said cathode and a point of reference potential, an input circuit including a signal frequency source coupled between said point of reference potential and said grid electrode, an output circuit coupled between said point of reference potential and said anode electrode, a grid condenser and a grid resistor in circuit with said source and said grid electrode, said resistor having such a high value of resistance that blocking oscillations tend to occur, and a second resistor connected between said point of reference potential and said cathode for establishing a high order of degeneration at the blocking frequency to prevent the establishment of said blocking oscillations, the reactance of said cathode-connected condenser for currents of signal frequency forming an effective by-pass for said second resistor to prevent degeneration at said signal frequency.

2. A combined detector-oscillator system as defined in claim 1 wherein a radio frequency choke is also connected between said cathode and said second resistor.

3. A combined detector-oscillator system comprising an electron discharge tube having at least a cathode, a signal control grid and an anode, a signal input circuit tunable over a predetermined frequency range connected to the control grid, the input circuit presenting an inductive reactance at an intermediate frequency below said frequency range; an oscillator circuit tunable over a different frequency range connected in the cathode-anode circuit of said tube; an output circuit tuned to said intermediate frequency resulting from the interaction in said cathode-anode circuit of currents derived from said signal input circuit and said oscillator circuit; a grid condenser connected between said input circuit and said grid electrode whose capacitive reactance at said intermediate frequency substantially equals the inductive reactance of said input circuit at said intermediate frequency when said input circuit is tuned to one end of its range; and a grid resistor connected between said grid electrode and a point on the cathode-anode circuit of said tube.

4. A device of the character described in claim 3 which includes, in addition, a cathode resistor connected in series with the cathode-anode circuit of said tube.

5. A device of the character described in claim 4 in which the value of said grid resistor is at least 20 megohms, and which includes, in addition, a second condenser connected effectively in shunt with said cathode resistor and of such a value that said cathode resistor is effectively bypassed only for currents of said intermediate frequency, and higher, whereby a degenerative feedback is produced for frequencies of the order determined by the time constant of said grid resistor and capacitor, and currents of said intermediate frequency are effectively prevented from appearing on said grid electrode.

6. A device of the character described in claim 5 which is further characterized in that said second condenser is also a component of said oscillator circuit.

7. A device of the character described in claim 6 which is further characterized in that the point to which said grid resistor is connected in the cathode-anode circuit of said tube is a point intermediate the ends of said cathode resistor.

8. A combined detector-oscillator system comprising an electron discharge tube having at least a cathode, a signal control grid and an anode, a signal input circuit tunable over a predetermined frequency range connected between said control grid and ground, an oscillator circuit tunable over a different frequency range connected in circuit with said anode, cathode and ground, a circuit tuned to a frequency resulting from the interaction between the frequencies of said first mentioned circuits connected between the anode and the oscillator circuit, a first resistor connected between cathode and ground, a first condenser of substantially low reactance at the intermediate frequency included in the connection between the signal circuit and control grid, and a second resistor of substantially large value connected between control grid and said first resistor, said oscillator circuit including as an element thereof a second condenser which is effectively in shunt with said first resistor to provide an effective by-pass therefor only for currents of said intermediate frequency or higher.

9. A combined detector-oscillator system as defined in claim 8 wherein said second resistor of substantially large value is connected between said control grid and the cathode end of said first resistor.

10. A combined detector-oscillator system as defined in claim 8 wherein said second resistor of substantially large value is connected between control grid and an intermediate point in said first resistor.

11. A combined detector-oscillator system comprising an electron discharge tube having at least a cathode, a signal control grid and an anode; a signal input circuit tunable over a predetermined frequency range connected between control grid and ground; an oscillator circuit tunable over a different frequency range and comprising an inductance element and a pair of condensers connected in series therewith, one end of said element being at radio frequency ground potential, the mid-point of said pair of condensers being connected to said cathode and the other end of said element being connected to said anode through an output circuit tuned to an intermediate frequency; a pair of resistors serially connected between said cathode and ground; a grid coupling condenser connected between said signal input circuit and said control grid; and a grid resistor connected between said control grid and the common terminal of said pair of resistors.

12. A combined detector-oscillator system as defined in claim 11 wherein the signal input circuit has an inductive reactance at said intermediate frequency and said grid coupling condenser has an equal capacitive reactance at said intermediate frequency.

13. A combined detector-oscillator system as defined in claim 12 wherein said grid resistor has such a value that the time constant of the grid coupling capacitor and the grid resistor is greater than one millisecond.

14. A combined detector-oscillator system as defined in claim 13 wherein the total resistance of said pair of resistors is of such a value that a degenerative feedback is produced so as to prevent blocking oscillations which would otherwise occur, and in which the effective value of the one of said pair of condensers connected between said cathode and ground provides an effective bypass for said pair of resistors for currents of said intermediate frequency and higher whereby no degeneration is produced at said intermediate frequency and higher.

15. A combined detector-oscillator system as defined in claim 11, wherein said pair of resistors are of values of the order of 1000 and 2200 ohms respectively, the grid coupling condenser is of a value of the order of 1000 $\mu\mu$f., and the grid resistor is of a value of the order of 30 megohms.

WILLIAM F. SANDS.

REFERENCES CITED

The following references are of record in the file of this patent:

UNITED STATES PATENTS

| Number | Name | Date |
|---|---|---|
| 2,278,030 | Weber | Mar. 31, 1942 |
| 2,282,861 | Gardiner | May 12, 1942 |
| 2,370,758 | Thompson | Mar. 6, 1945 |

FOREIGN PATENTS

| Number | Country | Date |
|---|---|---|
| 426,802 | Great Britain | Apr. 10, 1935 |
| 855,372 | France | May 9, 1940 |